United States Patent
Born, Jr.

(10) Patent No.: US 7,588,487 B1
(45) Date of Patent: Sep. 15, 2009

(54) GAME SKINNING PLIERS

(76) Inventor: Kenneth A. Born, Jr., 6951 Springhill Rd., Milton, FL (US) 32570

( * ) Notice: Subject to any disclaimer, the term of this patent is extended or adjusted under 35 U.S.C. 154(b) by 559 days.

(21) Appl. No.: 11/065,592

(22) Filed: Feb. 25, 2005

(51) Int. Cl.
*A22C 17/00* (2006.01)
(52) U.S. Cl. ..................................... 452/132
(58) Field of Classification Search ........... 81/119, 81/121.1, 165, 177.1, 177.2, 177.4, 180.1, 81/367, 368–372, 355, 359, 437, 438, 489, 81/490, 421, 422, 423, 424.5, 426.5, 427.5, 81/429; 7/138, 139, 143, 165; 452/102–105, 452/132, 133
See application file for complete search history.

(56) References Cited

U.S. PATENT DOCUMENTS

| | | | | |
|---|---|---|---|---|
| 2,990,863 A * | 7/1961 | Pantermoller | ................ | 30/135 |
| 4,307,635 A * | 12/1981 | Genova | ........................ | 81/463 |
| 4,386,542 A * | 6/1983 | Verna | .......................... | 81/420 |
| 4,519,278 A * | 5/1985 | Heldt | ........................ | 81/427.5 |
| 4,554,848 A * | 11/1985 | Galletto | ........................ | 81/447 |
| 4,669,341 A * | 6/1987 | Small | ........................... | 81/418 |
| 4,710,998 A * | 12/1987 | Gast | ........................... | 452/128 |
| 5,052,251 A * | 10/1991 | Mills | .......................... | 81/324 |
| 5,236,331 A * | 8/1993 | Liu | .............................. | 72/461 |
| 5,305,669 A * | 4/1994 | Kimbro et al. | ................ | 81/423 |
| 6,019,352 A * | 2/2000 | Mayer | ........................ | 254/248 |
| 6,175,998 B1 * | 1/2001 | Leo | .............................. | 29/268 |
| 6,279,433 B1 * | 8/2001 | Chervenak | ................ | 81/427.5 |
| 6,336,386 B1 * | 1/2002 | Lee | ............................. | 81/328 |
| 6,725,486 B2 * | 4/2004 | Oka | .............................. | 7/127 |
| 6,961,973 B1 * | 11/2005 | Smith | ........................... | 7/139 |
| 6,966,243 B1 * | 11/2005 | Liao | ............................. | 81/367 |

* cited by examiner

*Primary Examiner*—Thomas Price
(74) *Attorney, Agent, or Firm*—Peter Loffler

(57) ABSTRACT

A selectively locking plier-type tool for use in skinning game has a pair of opposing jaws, a main handle and a clamping handle for articulating the opposing jaws with respect to one another. A pair of plates are formed respectively on the pair of jaws such that the pair of plates each have straight teeth that mesh with one another whenever the pair of opposing jaws is brought into an apposed position. A pulling handle extends downwardly from the main handle of the tool and a weighted member is removably attached to the pulling handle.

2 Claims, 2 Drawing Sheets

GAME SKINNING PLIERS

BACKGROUND OF THE INVENTION

1. Field of the Invention

The present invention relates to locking-type pliers that have a pair of plates that each have teeth that intermesh with teeth on the opposing jaw's plate in order to provide gripping assistance during game skinning and that have a pulling handle attached to the main handle for added mechanical advantage.

2. Background of the Prior Art

Many hunters skin by hand wherein one hand of the hunter pulls on the skin and a knife held in the other hand helps loosen the skin as needed. Sometimes, the skinning process is initiated with the skinning knife in order to start the skinning process and then both hands of the hunter pull on the skin in order to detach the skin from the carcass of the animal. Oftentimes, one or more sets of pliers are used to help grip the skin of the animal and pull the skin from the carcass. The tremendous mechanical advantage offered by the pliers can greatly expedite the skinning of even the toughest of hides.

The problem with using ordinary pliers for gaming skinning assistance is that most typical pliers have jaws with relatively small gripping footprints with the attendant result that maintaining a firm grip on the skin with the pliers becomes a challenge. Even with the clamping force asserted by the pliers, the pliers tend to slip off of the hide. To address this problem, game skinning pliers have been proposed wherein the jaws of the pliers have gripping teeth that bite into the skin and cover a larger gripping surface area in order to perfect a grip of the skin. However, the problem with such devices is that the teeth puncture the hide, resulting in local weakening of the hide. With the added mechanical advantage supplied by the pliers, oftentimes the result is tearing of the hide at the gripping point. This problem is also sometimes faced by the use of ordinary pliers.

Accordingly, there exists a need in the art for a set of pliers that can be used for game skinning purposes, which pliers address the above-stated problems found in the current art. Such pliers should provide a firm grip across a relatively large gripping footprint without the jaws puncturing into the hide which can raise the possibility of tearing the hide. Such pliers, which should be of relatively simple design and construction and should be relatively easy to use and maintain, must offer the clamping force and mechanical advantage offered by other pliers.

SUMMARY OF THE INVENTION

The game skinning pliers of the present invention address the aforementioned needs in the art. The game skinning pliers are used for game skinning purposes and provide a firm grip onto the hide being clamped and have a large gripping footprint. The jaws tend not to puncture the hide during clamping or hide skinning so as to reduce the tendency of the pliers to tear the hide at the point of clamping. The game skinning pliers have an extended pulling handle that offers superior pulling power while maintaining a high-degree of safety during the skinning process. The game skinning pliers are of relatively simple design and construction, are relatively easy to use and maintain, and offer the clamping force and mechanical advantage offered by other pliers.

The game skinning pliers of the present invention are comprised of a selectively locking plier-type tool that has a first jaw with a main handle and a first plate that has a first set of coextensive rectangular-shaped teeth and a first set of coextensive cavities beside the first set of teeth. A second jaw with a clamping handle has a second plate with a second set of coextensive rectangular-shaped teeth and a second set of coextensive cavities beside the second set of teeth. The first jaw and the second jaw are pivotally attached to one another and are articulatable by the main handle and the clamping handle between a spaced apart condition and a clamped position wherein the first set of teeth are received within the second set of cavities and the second set of teeth are received within the first set of cavities. The first set of teeth located on the first plate are parallel with one another and the second set of teeth located on the second plate are parallel with one another. A pulling handle is attached to and extends downwardly from the main handle in a direction opposite the first jaw and the second jaw. A weighted member is removably attachable, as needed, to the pulling handle.

BRIEF DESCRIPTION OF THE DRAWINGS

Similar reference numerals refer to similar parts throughout the several views of the drawings.

DESCRIPTION OF THE PREFERRED EMBODIMENT

Figure 1:
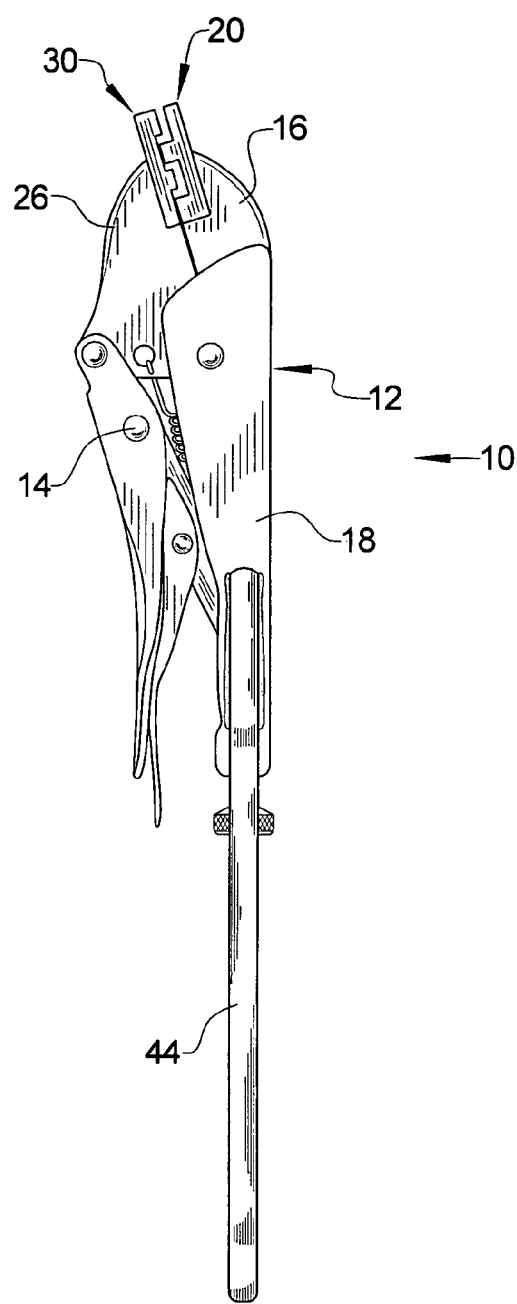
FIG. 1 is a side elevation view of the game skinning pliers of the present invention.
Figure 2:
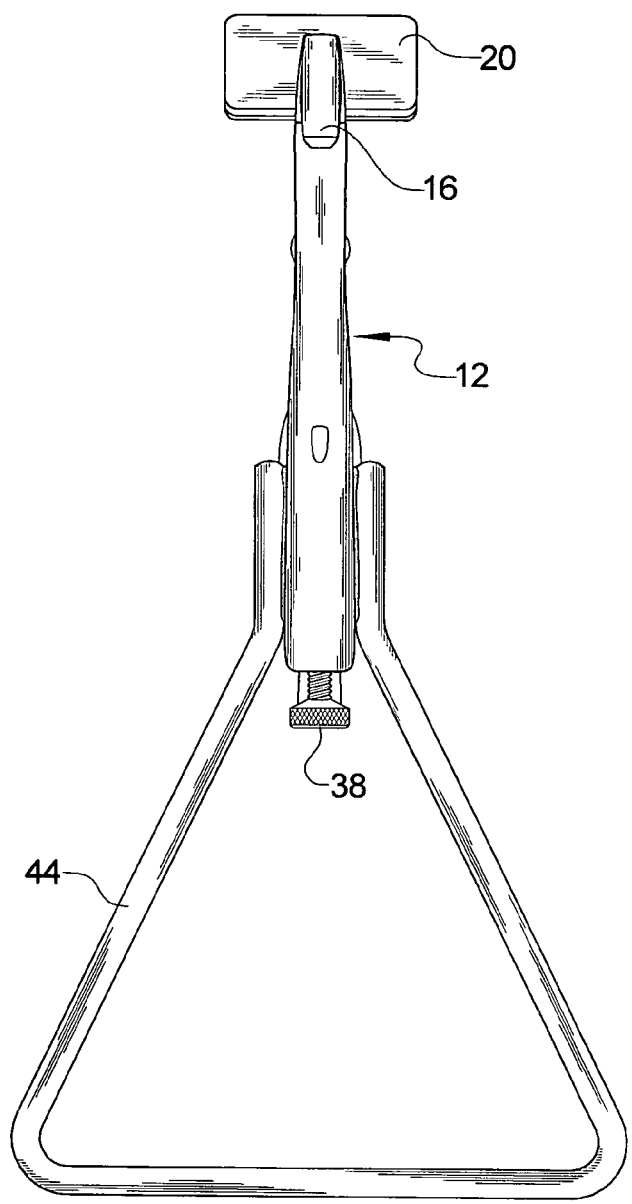
FIG. 2 is a plan view of the game skinning pliers.
Figure 3:
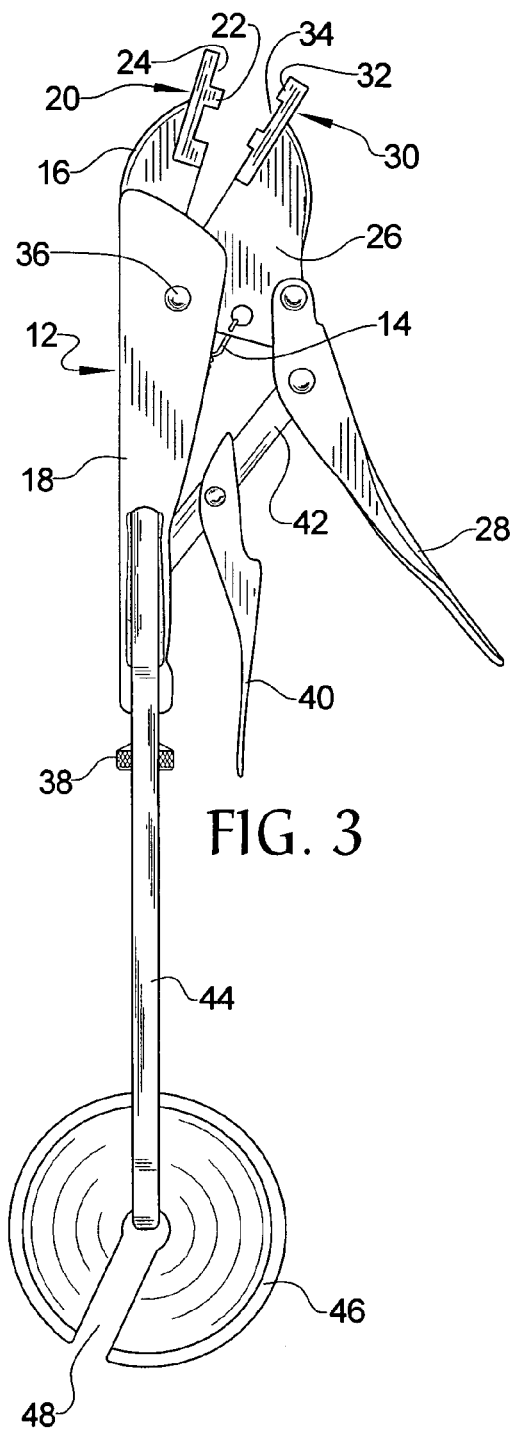
FIG. 3 is an elevation view of the game skinning pliers with an optional weighting member attached.
Figure 4:
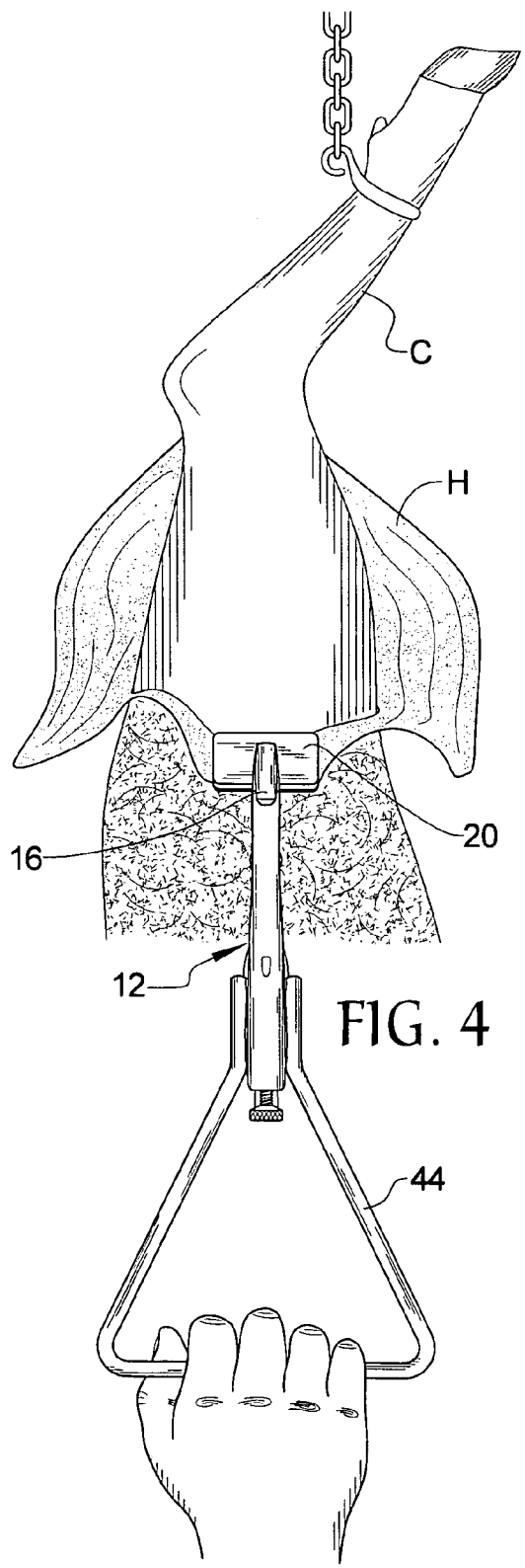
FIG. 4 is an environmental view of the game skinning pliers in use.

Referring now to the drawings, it is seen that the game skinning pliers of the present invention, generally denoted by reference numeral 10, are comprised of a standard locking-type plier-type tool 12 which typically has an over-center locking mechanism (partially shown and labeled as 14) for selectively locking the tool 12 in a desired position. The tool 12 has a first jaw 16 with a main handle 18 and a first plate 20 that has a first set of coextensive rectangular-shaped teeth 22 and a first set of coextensive cavities 24 beside the first set of teeth 22. A second jaw 26 with a clamping handle 28 has a second plate 30 with a second set of coextensive rectangular-shaped teeth 32 and a second set of coextensive cavities 34 beside the second set of teeth 32. The first set of teeth 22 located on the first plate 20 are parallel with one another and the second set of teeth 32 located on the second plate 30 are parallel with one another. Each plate 20 and 30, which each may be generally rectangular in shape, and their respective teeth 22 and 32, are made from an appropriate material such as metal and each plate 20 and 30 may be attached, by welding or other appropriate technique to the jaws of an existing locking-type set of pliers in order to retrofit an existing set of pliers with the features of the present invention 10, or may be formed during the manufacturing of the tool 10.

The first jaw 16 and the second jaw 26 are pivotally attached to one another by an appropriate pivot pin 36 and are articulatable between a spaced apart condition and a clamped position. The tool 10 is gripped by the main handle 18 and the clamping handle 28 is used to articulate the pair of jaws 16 and 26 toward and away from one another. Once the over-center locking mechanism 14 locks in, the jaws 16 and 26 are held in predetermined juxtaposition which position may be altered by an adjustment knob 38 located on the main handle 18. A release bar 40, attached to a positioning linkage 42, is used to release and over-center locking mechanism locking 14 and allow the jaws 16 and 26 to again articulate with respect to one another. The architecture of the pliers described above is a typical locking-type pliers architecture, with some of the features neither shown nor described in detail as such features are well known in the art and it is expressly understood that varying designs of pliers can be used as part of the present tool 10 in keeping within the scope and spirit of the present invention 10.

As the first jaw 16 and the second jaw 26 are drawn into apposed relationship, the first set of teeth 22 are received within the second set of cavities 34 and the second set of teeth 32 are received within the first set of cavities 24 in order to intermesh the two plates 20 and 30.

A pulling handle 44 is attached to and extends downwardly from the main handle 18 in a direction opposite the first jaw 16 and the second jaw 26. The pulling handle 44, which has the illustrated triangular shape, a D-shape, a T-shape, etc., is made from an appropriate material such as metal, and is attached to the main handle 18 in appropriate fashion such as by welding or screwing the pulling handle 44 to the main handle 18. A weighted member 46 of appropriate mass is removably attachable to the pulling handle 44. Attachment of the weighted member 46 to the pulling handle 44 may be in appropriate fashion such as by having a slit 48 in the weighted member 46 and having the pulling handle 44 received within the slit 48, by providing the weighted member 46 with an appropriate clip, hook, etc., (neither illustrated) and attaching the weighted member 46 to the pulling handle 44, etc.

In order to use the game skinning pliers 10 of the present invention, the jaws 16 and 26 are placed into the spaced apart relationship and are thereafter brought together in order to clamp onto a hide H such that the jaws 16 and 26 are locked with the pliers 12 adjusted by the adjustment knob 38 as needed in order to achieve the desired force of clamping. As the jaws 16 and 26 are clamped, the plates 20 and 30 mesh with one another through the hide H with the respective teeth 22 and 32, being received within the respective cavities 34 and 24. The tool 10 is now clamped onto the hide H and is used to assist in the skinning process. The user grips the device 10 via the pulling handle 44, which gives the user additional mechanical advantage relative to grasping the handles 18 and 28 of the pliers 12 alone. If desired, the weighted member 46 can be attached to the pulling handle 44 in order to allow the user to devote both hands to more precisely cut away the hide H such that the weighted member 46 acts, via gravity, to pull downwardly on the pliers 12 and thus on the hide H. The mass of the weighted member 46 should be sufficient to offer sufficient force onto the hide H being skinned so as to offer actual assistance to the user, but not so heavy as to be unwieldy. The exact mass is dependent on the particular hide H to be skinned. Once the carcass C is skinned, the pliers 12 are unclamped from the hide H. The use of the pulling handle 44 accelerates the skinning process and adds a significant degree of safety by displacing the user's hands away from the blade of the knife while cutting/trimming the hide H from the carcass C.

While the invention has been particularly shown and described with reference to an embodiment thereof, it will be appreciated by those skilled in the art that various changes in form and detail may be made without departing from the spirit and scope of the invention.

I claim:

1. A selectively locking plier-type tool having a first jaw with a main handle and a first plate having a first set of coextensive rectangular-shaped teeth and a first set of coextensive cavities beside the first set of teeth, a second jaw with a clamping handle and with a second plate having a second set of coextensive rectangular-shaped teeth and a second set of coextensive cavities beside the second set of teeth, the first jaw and the second jaw pivotally attached to one another and articulatable by the main handle and the clamping handle between a spaced apart condition and a clamped position wherein the first set of teeth and the second set of teeth intermesh with one another with at least some of the first teeth being received with a respective one of the second cavities and at least some of the second teeth being received within a respective one of the first cavities and such that a generally triangular shaped pulling handle extends downwardly from the main handle, the pulling handle having a first leg and a second leg each attached to the main handle and each extending diagonally downwardly from the main handle in opposed direction from each other such that a third leg joins distal ends of the first leg and the second leg, the third leg being in generally normal orientation to a longitudinal axis of the main handle and the pulling handle being on a plane that is generally parallel with a plane of the main handle and the third leg being dimensioned so as to be able to be grasped by substantially the entire hand of a human.

2. The plier-type tool as in claim 1 further comprising a weighted member removably attachable to the pulling handle.

* * * * *